United States Patent [19]

Hatabe

[11] Patent Number: 4,660,195
[45] Date of Patent: Apr. 21, 1987

[54] CHANNEL DETECTING CIRCUIT IN A RECEIVER IN A TIME-DIVISION MULTIPLEX TRANSMISSION SYSTEM

[75] Inventor: Michinori Hatabe, Kawasaki, Japan

[73] Assignee: Nitsuko Limited, Kawasaki, Japan

[21] Appl. No.: 715,509

[22] Filed: Mar. 25, 1985

[30] Foreign Application Priority Data

Mar. 23, 1984 [JP] Japan .................................. 59-54477

[51] Int. Cl.⁴ ............................. H04J 3/24; H04J 3/06
[52] U.S. Cl. ........................................ 370/92; 370/101
[58] Field of Search ...................... 370/86, 89, 94, 92, 370/101, 100; 340/825.05, 825.07, 825.52

[56] References Cited

U.S. PATENT DOCUMENTS

| | | | |
|---|---|---|---|
| 3,781,478 | 12/1973 | Blahut et al. | 370/86 |
| 3,973,242 | 8/1976 | Field et al. | 340/825.52 |
| 4,011,412 | 3/1977 | Mattern | 370/86 |
| 4,199,663 | 4/1980 | Herzog | 370/92 |

Primary Examiner—Douglas W. Olms
Assistant Examiner—Wellington Chin
Attorney, Agent, or Firm—Roberts, Spiecens & Cohen

[57] ABSTRACT

In a receiver receiving a time-division multiplex signal of a plurality of channels with each channel signal having a start signal part, an address signal part, an information signal part, and a blank interval arranged in this order, a channel detecting circuit for detecting the channel signal assigned to the receiver is provided with a blank interval detecting circuit in addition to an address detecting circuit for detecting the address signal part representing the address assigned to the receiver, in order to avoid an erroneous detection of the address detection circuit at a start condition of the receiver. Application of the multiplex signal to the address detecting circuit is prevented until the blank interval detection circuit initially detects one blank interval of the multiplex signal. At a start condition of the receiver, application of the multiplex signal to the address detecting circuit starts at not an intermediate time position in one channel signal but the start signal part of a subsequent channel signal.

7 Claims, 6 Drawing Figures

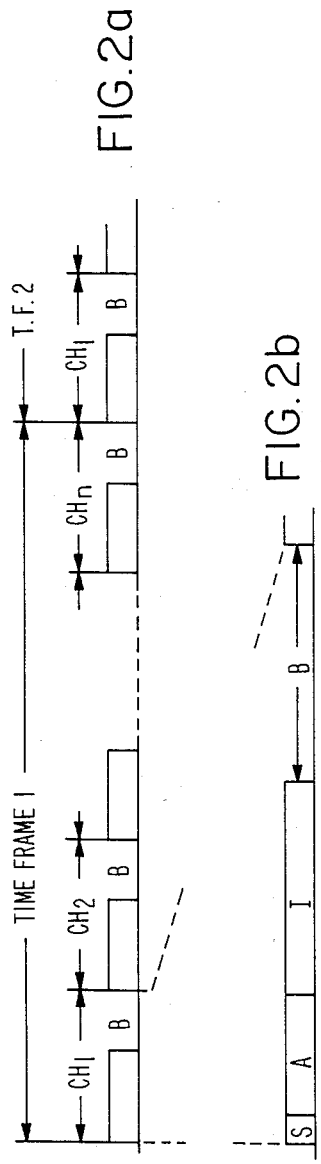
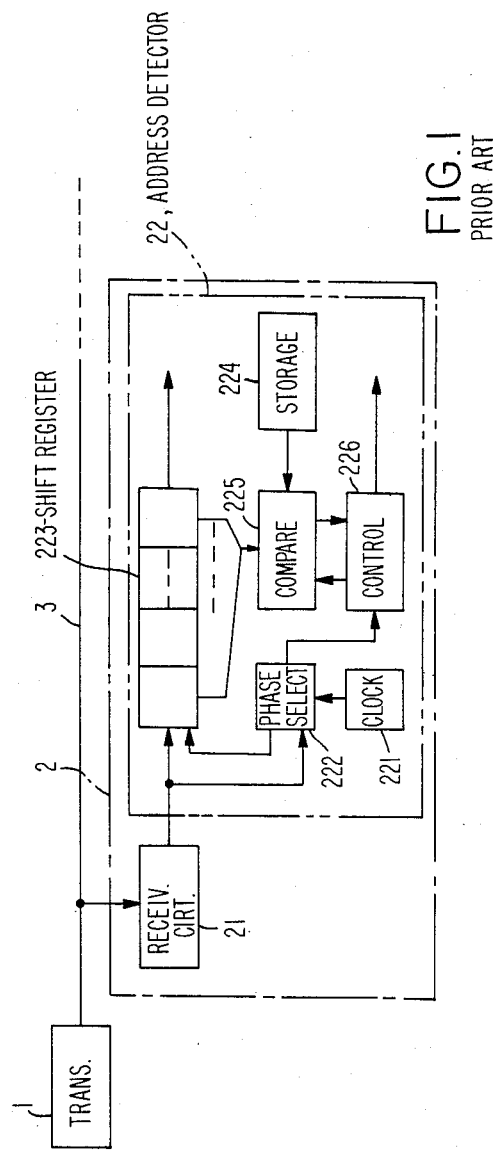

| INPUT | | | | OUTPUT |
|---|---|---|---|---|
| $\overline{PR}$ | $\overline{CLR}$ | CK | D | Q |
| H | L | X | X | L |
| H | H | I | H | H |
| H | H | L | X | $Q_0$ |

CHANNEL DETECTING CIRCUIT IN A RECEIVER IN A TIME-DIVISION MULTIPLEX TRANSMISSION SYSTEM

BACKGROUND OF THE INVENTION

1. Field of the Invention

The present invention relates to a time-division multiplex transmission system, and in particular, to a channel detection in a receiver in the system.

2. Description of the Prior Art

In order to transmit information to different receivers from a single transmitter through a common transmission line, a time-division multiplex transmission system is used.

In the time-division multiplex transmission system, a repetition period or a time frame is divided into a plurality of time slots which are used as channels for transmitting information to different receivers, respectively.

In a certain time-division multiplex signal, a digital signal in a time slot of a channel comprises a start signal part, an address signal part, an information signal part, and a blank interval, which are arrayed in this order. The start signal part comprises a pulse signal corresponding to a start bit. The address signal part comprises a digital signal representing an address of a receiver corresponding to the channel. The information signal part comprises a digital data signal representing the information to be transmitted to a corresponding receiver. The blank interval is a space between the information signal part and the subsequent channel signal.

Each receiver in the time-division multiplex transmission system has a circuit for detecting the address signal corresponding thereto from the multiplex signal so as to detect the channel signal assigned thereto.

A known address detecting circuit comprises a storage device storing an address assigned to the receiver, and a comparing circuit comparing the address in the storage device with the signal received at the receiver. When the address is detected in the received signal by the comparison, the comparing circuit generates a detection signal. Then, the receiver can discriminate its channel signal from the multiplex signal.

The address detecting circuit starts its operation by reception of the start signal part and maintaining the operation during a time period equal to the total amount of a time interval of the start signal part and another time interval of the address signal part. Once the address assigned to the receiver is detected in the received multiplex signal, the operation of the address detecting circuit is thereafter repeated at a constant interval equal to the time frame.

At a start condition of the system, or at a start condition of a receiver in the system, the initial pulse applied to the address detecting circuit drives the circuit as if it is a pulse of the start signal part, so that the operation of the address detecting circuit of the receiver starts at an indefinite time position of the time frame of the multiplex signal. There is a probability than an information signal part of each channel signal in the multiplex signal has a portion having the same signal pattern as the address signal part of the channel corresponding to the receiver. If the signal portion is applied to the address detecting circuit at the start condition, the address detecting circuit of the receiver erroneously detects the signal portion as the address signal part, so that the receiver cannot discriminate its channel signal from the multiplex signal.

The present invention attempts to use the blank interval in order to resolve the above-described problem.

SUMMARY OF THE INVENTION

It is an object of the present invention to provide a channel detecting circuit in a receiver in a time-division multiplex transmission system wherein, at a start condition receiving operation of the receiver, the receiver can promptly and correctly discriminate its channel signal in the multiplex signal.

As described above, a known receiver in a time-division multiplex transmission system comprises an address detecting circuit for detecting an address signal assigned to the receiver in the multiplex signal in order to discriminate its channel signal in the multiplex signal. According to the present invention, a channel detecting circuit of the receiver is obtained which comprises the address detecting circuit, blank interval detecting means detecting the blank interval in each channel signal in the multiplex signal, and gate means blocking the multiplex signal from being transmitted to the address detecting circuit but permitting the multiplex signal to be transmitted to the address detecting circuit once the blank interval being detected by the blank interval detecting means.

According to the present invention, when the receiving operation of the receiver starts, application of the multiplex signal to the address detecting circuit does not start at an intermediate time position of any one channel signal but starts at a head of a channel signal. Therefore, operation of the address detecting circuit and each channel signal are synchronized with each other, so that the erroneous channel detection can be avoided.

Further objects and features of the present invention will be understood from the following detailed description of preferred embodiments referring to the accompanying drawings.

BRIEF DESCRIPTION OF THE DRAWINGS

FIG. 1 is a schematic view illustrating a transmission system with a receiver having a known address detecting circuit;

FIG. 2a is a schematic view illustrating a time frame of a multiplex signal in a time-division multiplex transmission system to which the present invention is applied;

FIG. 2b is an enlarged view of one channel signal in the multiplex signal;

DETAILED DESCRIPTION OF PREFERRED EMBODIMENTS

Figures 3, 4:
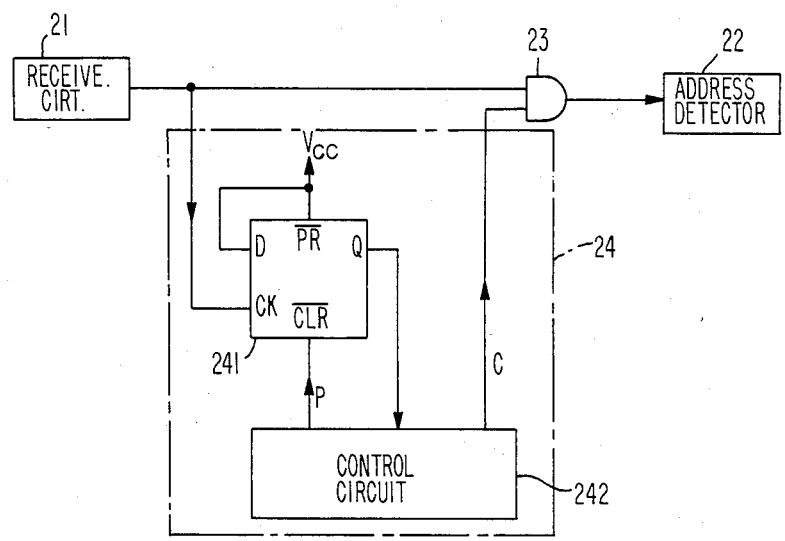
FIG. 3 is a schematic view of a channel detecting circuit of an embodiment according to the present invention.
FIG. 4 is a view illustrating a function table of a D-type flip-flop circuit used in the embodiment.

Referring to FIG. 1, in case it is desired to transmit digital information from a transmitter 1 to a plurality of receivers (one of which is shown at 2 in the figure) through a common transmission line 3, a time-division multiplex transmission system is used.

Referring to FIG. 2a, a time-division multiplex signal in the system has a repetition time period or a time frame. Each time frame is divided into a plurality of (n) time slots which are used as n channels for n receivers.

Referring to FIG. 2b in addition to FIG. 2a, a channel signal assigned to each time slot comprises a start signal part S representing a start bit, an address signal part A representing an address allotted to the channel, an information signal part I representing information to be transmitted to the corresponding receiver, and a blank interval B, which are arrayed in this order in the time slot, as shown in FIG. 2b.

Receiver 2 has a receiver circuit 21 which regenerates the multiplex signal from a signal transmitted through transmission line 3. The regenerated multiplex signal is applied to an address detecting circuit 22 to discriminate the channel signal assigned to the receiver 2 from the other channel signals.

Address detecting circuit 22 comprises a clock pulse generator 221 generating a multiphase clock pulse, a clock phase selector 222 for selecting a clock pulse synchronized with the multiplex signal from receiving circuit 21 at reception of the start signal part S, and a shift register 223. The digital signal of the multiplex signal from receiving circuit 21 is registered in shift register 223 by control of the clock pulses selected from clock phase selector 222. A number of stages of shift register 223 is determined to be equal to the bit number of the start signal part S and the address signal part A.

The address detecting circuit 22 also has an address storage device 224 storing an address assigned to the receiver 2. Address storage device 224 is preferably a type to which a desired address can be preset by means of, such as a rotary switch.

The address stored in storage device 224 is applied to a comparator 225 and compared with the data registered in shift register 223 under control of a control circuit 226. That is, when clock phase selector 222 receives the start signal part S, a signal is applied from clock phase selector 222 to control circuit 226, which, in turn, drives comparator 225. When the data and the address coincide with each other, the comparator 225 generates a coincidence signal to control circuit 226. Thus, the address signal part of the channel assigned to the receiver 2 is detected. Control circuit 226 generates a channel detection signal in response to the coincidence signal to a circuit (not shown) for deriving the information signal part subsequent to the address signal part. Simultaneously, control circuit 226 generates a stop signal to comparator 225.

Thereafter, control circuit 226 drives comparator 225 at a constant time interval equal to the time frame so that the above-described address detection operation is repeated. As a result, the channel assigned to the receiver is descriminated from the other channels.

As described hereinbefore, the address detecting circuit sometimes carries out erroneous detection at a start condition of the receiving operation of the receiver.

The present invention provides a channel detecting circuit wherein the erroneous detection of the address detecting circuit is reliably avoided.

Referring to FIG. 3, an AND gate 23 is provided in a transmission path from the receiving circuit 21 to the address circuit 22, according to the present invention. An input terminal of AND gate 23 is connected to an output of receiving circuit 21 and an output terminal of AND gate 23 is connected to an input of address detecting circuit 22. A blank interval detecting circuit 24 is connected to the other input terminal of AND gate 23. Accordingly, when no blank interval detection signal is applied to AND gate 23, the multiplex signal is not transmitted from receiving circuit 21 to address detection circuit 22.

The blank interval detection circit 24 is a circuit for detecting the blank interval (B in FIGS. 2a and 2b) in the multiplex signal. When blank interval detection circuit 24 detects one blank interval B in the multiplex signal from receiving circuit 21, the circuit 24 generates a blank interval detection signal. The blank interval detection signal is applied to AND gate 23 to open the gate.

Once the blank interval is detected, the blank interval detection signal is maintained thereafter, while further time interval detection operation is stopped.

Therefore, application of the multiplex signal from receiving circuit 21 to address detecting circuit 22 starts at the start signal part of one channel signal of the multiplex signal. Therefore, the erroneous channel detection can be avoided at a start condition of the receiver.

An example of the blank interval detecting circuit 24 comprises a trigger circuit of a delayed (D-type) flip-flop circuit 241 and a control circuit 242.

D-type flip-flop circuit has a clock input terminal CK connected to the output of receiving circuit 21, a data input terminal D maintained at a high level ("H" level) voltage of $+V_{cc}$, a preset input terminal $\overline{PR}$ maintained at "H" level of $+V_{cc}$, a clear pulse input terminal $\overline{CLR}$ connected to control circuit 242, and an output terminal Q connected to control circuit 242.

A relationship between each input signal and the output signal is shown at a function table in FIG. 4.

The following symbols are used in the function table in FIG. 4;

H = high level (steady state)
L = low level (steady state)
↑ = irrelevant (any input, including transitions)
Qo = level of Q before the indicated steady state input conditions were established.

Control circuit 242 provides a control pulse of a low level ("L" level) at a constant time interval to $\overline{CLR}$ terminal and checks up the signal level on Q terminal at the same time interval but spaced from the control pulse.

When control circuit 242 detects "L" level signal on Q terminal by checking-up operation, control circuit 242 generates the blank interval detection signal, which is applied to AND gate 23. Thereafter, the control circuit 242 stops the generation of the control pulse and the checking-up operation while maintaining the blank interval detection signal.

Figure 5:
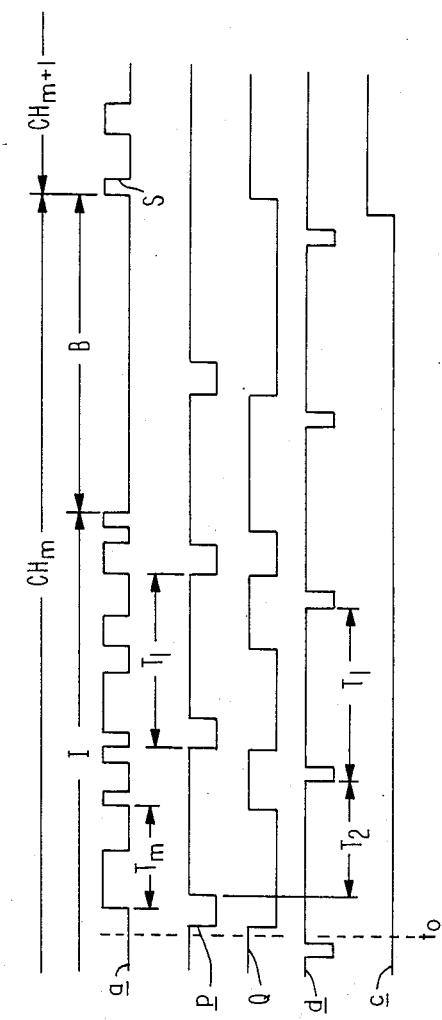
FIG. 5 is a view illustrating signal waveforms at various points in the circuit of FIG. 3.

Referring to FIG. 5, the operation of the blank interval detection circuit 24 will be described below.

When the receiver starts at a time $t_o$, it is provided that the output of receiving circuit 21 starts at an intermediate time position of the information signal part I in one channel signal CHm of the multiplex signal a.

Control circuit 242 also starts at the time $t_o$ to generate the control signal p at a constant interval $T_1$ and to perform the checking-up operation as shown at d in FIG. 5.

Since the multiplex signal a and the control pulse p are applied to CK terminal and $\overline{CLR}$ terminal of D-type flip-flop circuit 241, respectively, and since the input signals and the output signal of the D-type flip-flop circuit 241 have a relationship illustrated in FIG. 4, the output level on Q terminal varies in the manner as shown at Q in FIG. 5.

As will be noted from multiplex signal a, output signal Q, and checking-up signal d, a time duration when Q output signal is maintained at "L" level is increased at a period of the blank interval B so that the "L" level of the Q output signal is detected. Thus, the control circuit 242 generates the blank interval detection signal as shown at c in FIG. 5.

AND gate 23 is opened by the blank interval detection signal, so that application of the multiplex signal a to the address detecting circuit 22 starts at the start signal part S of the next channel signal $CH_{m+1}$.

In order that the blank interval is reliably detected, the constant time interval $T_1$ should be determined to satisfy the following relationship:

$$T_B < T_1 < B/2$$

where $T_B$ is the maximum time space between a transition point from a low level to a high level and the next transition point from a low level to a high level in the multiplex signal, and B is the blank interval.

The checking-up signal d is generated at the same interval $T_1$ but is spaced from the control signal p by a time duration $T_2$.

What is claimed is:

1. In a channel detecting circuit in a receiver receiving a time-division multiplex signal having a plurality of channels corresponding to a plurality of receivers, each channel signal comprising a start signal part corresponding to a start bit, an address signal part representing an address assigned to a corresponding receiver, an information signal part representing information to be transmitted to the corresponding receiver, and a blank interval which are arrayed in this order, said channel detecting circuit of the receiver comprising an address detecting circuit detecting the address signal part of the channel signal corresponding to the receiver in the multiplex signal, said address detecting circuit starting its address detecting operation by reception of the start signal part, the improvement wherein said channel detecting circuit further comprises means detecting said blank interval in the time-division multiplex signal received at the receiver, said blank interval detecting means generating a detection signal at a time when said blank interval is detected, said detection signal being maintained after a first detection of said blank interval, and gate means blocking transmission of the multiplex signal to said address detecting circuit in response to not receiving said detection signal from said blank interval detection means but permitting the multiplex signal to be transmitted to said address detecting circuit in response to said detection signal from said blank interval detecting means.

2. The channel detecting circuit in a receiver as claimed in claim 1, wherein said address detecting circuit comprises address storage means storing the address assigned to the receiver, shift register means storing signal elements of the multiplex signal inputted thereto, and comparing means comparing said address stored in said address storage means with the content in said shift register means, said comparing means generating a channel detection signal at a time when said address and said content coincide with each other.

3. The channel detecting circuit as claimed in claim 1, wherein said blank interval detecting means comprises a trigger circuit having an input terminal to which the multiplex signal is applied, a control terminal to which a control pulse is applied, and an output terminal, said trigger circuit operating so that said output terminal is maintained at a low level during a time period when said control terminal is at a low level, but is changed to a high level in response to a transition of said input terminal from a low level to a high level and is maintained at the high level thereafter during a time period when said control terminal is at a high level, and a control circuit generating the control pulse of a low level at a constant time interval and checking up the signal level on said output terminal at the same time interval but spaced from the control pulse by a predetermined time duration, said control circuit generating the blank interval detection signal at a time when the low level signal is observed on said output terminal by the checking-up operation, and thereafter stopping the generation of the control pulse and the checking-up operation.

4. The channel detecting circuit as claimed in claim 3, wherein said trigger circuit is a delayed flip-flop circuit having a clock input terminal (CK) to which the multiplex signal is applied, a data input terminal $(\overline{D})$ maintained at a high level, a preset input terminal $(\overline{PR})$ maintained at a high level, a clear input terminal $(\overline{CLR})$ to which said control pulse is applied and an output terminal (Q).

5. The channel detecting circuit as claimed in claim 3, wherein said constant time interval is smaller than one second of said blank interval.

6. The channel detecting circuit as claimed in claim 5, wherein said constant time interval is determined to be larger than the maximum time space between a transition point from a low level to a high level and the next transition point from a low level to a high level in the multiplex signal.

7. The channel detecting circuit as claimed in claim 1, wherein said gate means is an AND gate having two input terminals, and an output terminal.

* * * * *